UNITED STATES PATENT OFFICE.

JOHN C. FLEMING, OF BOSTON, MASSACHUSETTS.

FOOD COMPOUND.

1,232,267. Specification of Letters Patent. Patented July 3, 1917.

No Drawing. Application filed March 27, 1917. Serial No. 157,652.

*To all whom it may concern:*

Be it known that I, JOHN C. FLEMING, a citizen of the United States, residing at Boston, in the county of Suffolk and State of Massachusetts, have invented new and useful Improvements in Food Compounds, of which the following is a specification.

This invention is a food compound.

The object of the invention is to produce a food compound containing the nutritive and useful properties of peanuts, combined with product or cereal, in a form capable of being used as a food, a confection, or a beverage.

To produce the improved food compound, peanuts are treated in any suitable or desired manner, until they are digested and disintegrated, and then dried to form a substantial peanut meal. The digesting and disintegrating may be suitably carried out by the process described in Letters Patent 1,213,854, granted to me January 30, 1917.

A suitable quantity of the digested peanut meal is mixed with any desired proportion of a powdered product of cereal, such as malt, the two ingredients being mixed with water to form a plastic mass, which is then cooked by any preferred method, to such extent as may be desired. After cooking the mass is dried in a chamber constructed to protect the compound from atmospheric conditions and impurities to render it anhydrous, it being deliverd therefrom in the form of a previously digested proliquid. It is preferred to place the mixture on suitable trays, which are placed within a closed chamber covered with a substance, such as animal charcoal, capable of absorbing moisture and obnoxious gases. It is to be understood that the invention is not limited to the use of animal charcoal, as any other substance possessing similar properties may be used in lieu thereof. If desired, when the peanut meal and product of cereal are first mixed, suitable flavoring and color may be imparted by mixing in ingredients capable of producing the desired result, the same being well known. I have found that a mixture of one part digested peanut meal with two parts of malt, give excellent results, but I do not desire to limit myself to these proportions, for the reason that they are capable of wide variation.

I claim as my invention:—

1. A food compound comprising a cooked mixture of digested peanut meal, and product of cereal.

2. A food compound comprising a cooked anhydrous mixture of digested peanut meal and malt, substantially free of moisture.

3. A food compound consisting of a cooked and dried mixture of digested peanut meal and product of cereal.

4. A food compound consisting of a cooked mixture of digested peanut meal and malt.

In testimony whereof I have hereunto set my hand.

JOHN C. FLEMING.